(12) United States Patent
Bono et al.

(10) Patent No.: US 10,678,641 B2
(45) Date of Patent: Jun. 9, 2020

(54) TECHNIQUES FOR OPTIMIZING METADATA RESILIENCY AND PERFORMANCE

(71) Applicant: EMC IP Holding Company LLC, Hopkinton, MA (US)

(72) Inventors: Jean-Pierre Bono, Westborough, MA (US); Philippe Armangau, Acton, MA (US); William C. Davenport, San Diego, CA (US); Dennis Duprey, Raleigh, NC (US); Christopher A. Seibel, Walpole, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/277,125

(22) Filed: Feb. 15, 2019

(65) Prior Publication Data
US 2019/0179706 A1   Jun. 13, 2019

Related U.S. Application Data

(63) Continuation of application No. 14/674,382, filed on Mar. 31, 2015, now abandoned.

(51) Int. Cl.
*G06F 11/10* (2006.01)
*G06F 3/06* (2006.01)

(52) U.S. Cl.
CPC ........ *G06F 11/1076* (2013.01); *G06F 3/0619* (2013.01); *G06F 3/0647* (2013.01); *G06F 3/0689* (2013.01)

(58) Field of Classification Search
CPC .. G06F 11/1076; G06F 3/0619; G06F 3/0647; G06F 3/0689
See application file for complete search history.

(56) References Cited

U.S. PATENT DOCUMENTS 8,335,966 B1    12/2012  Lary et al.
9,003,227 B1 *   4/2015  Patel ................... G06F 11/1435
                                                714/15

(Continued)

OTHER PUBLICATIONS

Joukov, N., et al., "RAIF: Redundant Array of Independent Filesystenns", 24th IEEE Conference on Mass Storage Systems and Technologies (MSST 2007), Conference Location: San Diego, CA, Date of Conference: Sep. 24-27, 2007, pp. 1-14. (Year: 2007).*

*Primary Examiner* — Kyle Vallecillo
(74) *Attorney, Agent, or Firm* — BainwoodHuang (57) ABSTRACT

A method of protecting a filesystem against metadata corruption while maintaining high performance is provided. The method includes (a) receiving a storage command directing a computing device to store a block of file data to the filesystem and (b) in response: (1) writing the block to a data portion spanning a set of drives using a single-fault tolerant level of RAID, wherein writing the block includes performing exactly two write operations to the set of drives; and (2) writing filesystem metadata associated with the block to a metadata portion spanning a subset of the set of drives using a double-fault tolerant data redundancy scheme different than the single-fault tolerant level of RAID, the subset including at least three drives, the data and metadata portions being non-overlapping, wherein writing the metadata includes performing at least three write operations to the subset of the set of drives.

14 Claims, 5 Drawing Sheets

(56) References Cited

U.S. PATENT DOCUMENTS

| | | | |
|---|---|---|---|
| 9,069,682 B1 | 6/2015 | Veeraswamy | |
| 9,355,121 B1 | 5/2016 | Scheer et al. | |
| 9,690,837 B1 | 6/2017 | Davenport et al. | |
| 2003/0212872 A1 | 11/2003 | Patterson et al. | |
| 2009/0083504 A1* | 3/2009 | Belluomini | G06F 11/1076 711/162 |
| 2010/0262772 A1* | 10/2010 | Mazina | G06F 3/0613 711/114 |
| 2010/0275066 A1* | 10/2010 | Mazina | G06F 11/0727 714/42 |
| 2011/0154105 A1* | 6/2011 | Woodhouse | G06F 11/1076 714/6.24 |
| 2013/0173955 A1* | 7/2013 | Hallak | G06F 11/1076 714/6.24 |
| 2014/0019684 A1* | 1/2014 | Wei | G06F 11/1076 711/114 |
| 2015/0324145 A1 | 11/2015 | Akutsu et al. | |
| 2015/0347047 A1 | 12/2015 | Masputra et al. | |
| 2016/0011944 A1 | 1/2016 | Jain et al. | |

\* cited by examiner

| 34(1) Disk | 34(2) Disk | 34(3) Disk | 34(4) Disk | |
|---|---|---|---|---|
| 96(1)(a) | Slice a | (data) | | 88(1) 1st Data RAID-5 Volume |
| 96(1)(b) | Slice b | (data) | | |
| 96(1)(c) | Slice c | (data) | | |
| 96(2)(a) | Slice a | (data) | | 88(2) 2nd Data RAID-5 Volume |
| 96(2)(b) | Slice b | (data) | | |
| 96(2)(c) | Slice c | (data) | | |
| | | | | 99 Unallocated Space |
| 98(1)(a) | Slice a | (metadata) | | 92(1) 1st Metadata 3X Mirrored Volume |
| 98(1)(b) | Slice b | (metadata) | | |
| 98(1)(c) | Slice c | (metadata) | | |

Fig. 4B /32

| 34(1) Disk | 34(2) Disk | 34(3) Disk | 34(4) Disk | |
|---|---|---|---|---|
| 96(1)(a) | Slice a | (data) | | 88(1) 1st Data RAID-5 Volume |
| 96(1)(b) | Slice b | (data) | | |
| 96(1)(c) | Slice c | (data) | | |
| 96(2)(a) | Slice a | (data) | | 88(2) 2nd Data RAID-5 Volume |
| 96(2)(b) | Slice b | (data) | | |
| 96(2)(c) | Slice c | (data) | | |
| 96(3)(a) | Slice a | (data) | | 88(3) 3rd Data RAID-5 Volume |
| 96(3)(b) | Slice b | (data) | | |
| 96(3)(c) | Slice c | (data) | | |
| 98(2)(a) | Slice a | (metadata) | | 92(2) 2nd Metadata 3X Mirrored Volume |
| 98(2)(b) | Slice b | (metadata) | | |
| 98(2)(c) | Slice c | (metadata) | | |
| 98(1)(a) | Slice a | (metadata) | | 92(1) 1st Metadata 3X Mirrored Volume |
| 98(1)(b) | Slice b | (metadata) | | |
| 98(1)(c) | Slice c | (metadata) | | |

TECHNIQUES FOR OPTIMIZING METADATA RESILIENCY AND PERFORMANCE

CROSS-REFERENCE TO RELATED APPLICATIONS

This application is a Continuation that claims the benefit of priority of U.S. patent application Ser. No. 14/674,382, filed Mar. 31, 2015 and entitled "TECHNIQUES FOR OPTIMIZING METADATA RESILIENCY AND PERFORMANCE," the contents and teachings of which are incorporated herein in their entirety by this reference.

BACKGROUND

Data storage systems are often used to store large quantities of data with fast access times. In many situations, redundant arrays are used to protect against drive failures and corruption or write failures. Redundant Array of Independent Disks (RAID) technology is often used to prevent data loss. In RAID-5, a single disk failure per array can be recovered from, although recovery times can be slow. In RAID-6, two disk failures can be recovered from. RAID-6 also allows for detection of data corruption or a lost write.

SUMMARY

Unfortunately, the above-described conventional systems suffer from deficiencies. Although RAID-6 currently provides an acceptable level of protection for most usage scenarios, RAID-6 is computationally intensive and not always appropriate for all applications. However, in the event that there is an error in the metadata of a filesystem, the filesystem can be brought offline for potentially very long recovery times. Thus, if an application uses a lower level of protection, it is susceptible to going offline in the event of a metadata error. Some conventional systems protect against errors in metadata by implementing metadata duplication, in which the filesystem manager stores two copies of metadata within the filesystem, the metadata being further protected by the RAID of the system. Some conventional systems protect against errors in metadata by storing checksums for the metadata, allowing errors and lost writes to be detected even when using RAID-5. Some conventional systems even use both metadata duplication and metadata checksums. Unfortunately, these mechanisms degrade system performance. In addition, any time metadata is updated, multiple RAID stripes need to be completely re-written, including both data and metadata.

Thus, it would be desirable to provide a technique for protecting against metadata corruption while maintaining high performance and minimizing the number of stripes that need to be rewritten. This may be accomplished by storing the data and metadata of a filesystem separately, and applying a double-fault tolerant data redundancy scheme to the metadata. Thus, the metadata of a filesystem is stored on logical volumes that utilize triple mirroring or RAID-6 (or stronger forms of redundancy), regardless of what level of protection is used for the data of the filesystem. Since the metadata and data are stored separately, fewer stripe update operations are required.

One embodiment of the improved techniques is directed to a method performed by a computing device of protecting a filesystem against metadata corruption while maintaining high performance. The method includes (a) receiving a storage command directing the computing device to store a block of file data to the filesystem and (b) in response to receiving the storage command: (1) writing the block of file data to a data portion that spans a set of drives using a single-fault tolerant level of RAID, wherein writing the block of file data to the data portion includes performing exactly two write operations to the set of drives; and (2) writing filesystem metadata associated with the block of file data to a metadata portion that spans a subset of the set of drives using a double-fault tolerant data redundancy scheme different than the single-fault tolerant level of RAID, the subset including at least three drives, the data portion and the metadata portion being non-overlapping, wherein writing the filesystem metadata to the metadata portion includes performing at least three write operations to the subset of the set of drives. Other embodiments are directed to a system, a computerized apparatus, and a computer program product for performing methods of protecting a filesystem against metadata corruption while maintaining high performance similar to those described above.

BRIEF DESCRIPTION OF THE DRAWINGS

The foregoing and other objects, features, and advantages will be apparent from the following description of particular embodiments of the present disclosure, as illustrated in the accompanying drawings in which like reference characters refer to the same parts throughout the different views.

DETAILED DESCRIPTION

Embodiments are directed to techniques for protecting against metadata corruption while maintaining high performance and minimizing the number of stripes that need to be rewritten. This may be accomplished by storing the data and metadata of a filesystem separately, and applying a double-fault tolerant data redundancy scheme to the metadata. Thus, the metadata of a filesystem is stored on logical volumes that utilize triple mirroring or RAID-6 (or stronger forms of redundancy), regardless of what level of protection is used for the data of the filesystem. Since the metadata and data are stored separately, fewer stripe update operations are required.

Figure 1:
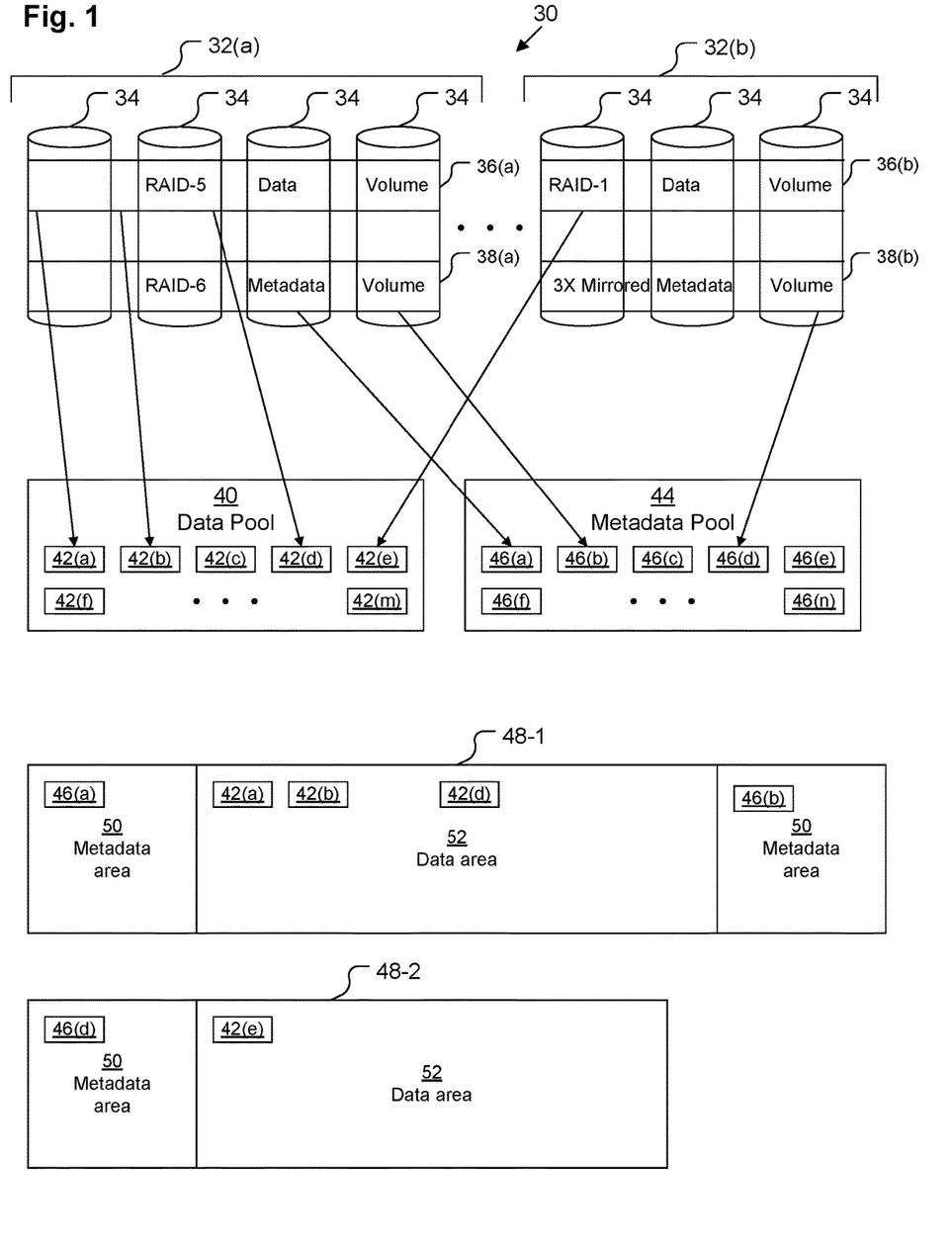
FIG. 1 is a block diagram depicting logical view of an example system for use in connection with various embodiments.

FIG. 1 depicts an example data storage system (DSS) 30 in which improved techniques hereof may be practiced. DSS 30 is an array-based system, such as, for example, a VNX®, VNXe®, or CLARiiON® CX4 data storage array provided by the EMC Corporation of Hopkinton, Mass. It should be understood, however, that, in some embodiments, DSS 30 may be any kind of computing device that provides storage using arrays of drives, such as, for example, a personal computer, a workstation computer, a server computer, an enterprise server computer, a laptop computer, etc.

DSS 30 includes one or more arrays 32 of disks 34. As depicted, array 32(a) is a RAID set of four disks 34, and array 32(b) is a RAID set of three disks 34. Array 32(a) includes at least one logical volume 36(a) used for storing data of filesystems 48 and at least one logical volume 38(a) used for storing metadata of filesystems 48. It should be understood that although only a single logical data volume 36(a) and only a single logical metadata volume 38(a) are depicted on array 32(a), there may be several of each (see, e.g., FIGS. 4A-4B). Array 32(b) includes at least one logical volume 36(b) used for storing data of filesystems 48 and at least one logical volume 38(b) used for storing metadata of filesystems 48. It should be understood that although only a single logical data volume 36(b) and only a single logical metadata volume 38(b) are depicted on array 32(b), there may be several of each (see, e.g., FIGS. 4A-4B). It should also be understood that, in some embodiments, all or some of the disks 34 within any given array 34 may be located external to the DSS 30.

As depicted, logical data volume 36(a) is configured as a RAID-5 RAID group and logical data volume 36(b) is configured as a RAID-1 RAID group, however, other RAID configurations are also possible. Typically, only a single RAID configuration is used for all logical data volumes 36 on a particular array 32.

As depicted, logical metadata volume 38(a) is configured as a RAID-6 RAID group and logical metadata volume 38(b) is configured as a triple-mirrored logical volume, however, other configurations are also possible. Typically, only a single configuration is used for all logical metadata volumes 38 on a particular array 32. The term "triple mirrored" means that all information is stored in three locations (on three different disks 34) within logical metadata volume 38(b) (i.e., a first copy, a first mirror, and a second mirror). See FIGS. 3A-3C for more detail regarding triple mirroring.

Each data volume 36 may be subdivided into data allocation units such as data slices 42 (depicted as data slices 42(a), 42(b), 42(c), 42(d), 42(e), 42(f), . . . , 42(m)), and each metadata volume 38 may be subdivided into metadata allocation units such as metadata slices 46 (depicted as metadata slices 46(a), 46(b), 46(c), 46(d), 46(e), 46(f), . . . , 46(n)). In some embodiments, slices 42, 46 are 256 megabytes in size, while in other embodiments, slices 42, 46 may be 1 gigabyte in size or some other size. Slices 42, 46 are logically mapped to particular address ranges for individual filesystems 48, providing the backing store.

Data slices 42 are organized in a data pool 40, while metadata slices 46 are organized in a metadata pool 44. As depicted, data slices 42(a), 42(b), and 42(d) are backed by storage from logical data volume 36(a), while data slice 42(e) is backed by storage from logical data volume 36(b). The location of the backing of data slices 42(c), 42(f), and 42(m) is not shown, but it comes from some logical data volume 36.

As depicted, metadata slices 46(a) and 46(b) are backed by storage from logical metadata volume 38(a), while metadata slice 46(d) is backed by storage from logical metadata volume 38(b). The location of the backing of metadata slices 46(c), 46(e), 46(f), and 46(n) is not shown, but it comes from some logical metadata volume 38.

Two filesystems 48-1, 48-2 are depicted as existing within DSS 30, each having one or more metadata areas 50 and one or more data areas 52. Filesystem 48-1 is depicted as having two metadata areas 50 backed by storage from metadata slices 46(a) and 46(b) and one data area 52 backed by data slices 42(a), 42(b), and 42(d). It should be noted that, although this is not required in all embodiments, the data slices 42(a), 42(b), and 42(d) that back data area 52 of filesystem 48-1 all come from the same array 32(a) of disks 34 as do the metadata slices 46(a), 46(b) that back metadata areas 50 of filesystem 48-1.

Filesystem 48-2 is depicted as having one metadata area 50 backed by storage from metadata slice 46(d) and one data area 52 backed by data slice 42(e). It should be noted that, although this is not required in all embodiments, the data slice 42(e) that backs data area 52 of filesystem 48-2 comes from the same array 32(b) of disks 34 as does the metadata slice 46(d) that backs metadata area 50 of filesystem 48-2.

Figure 2:
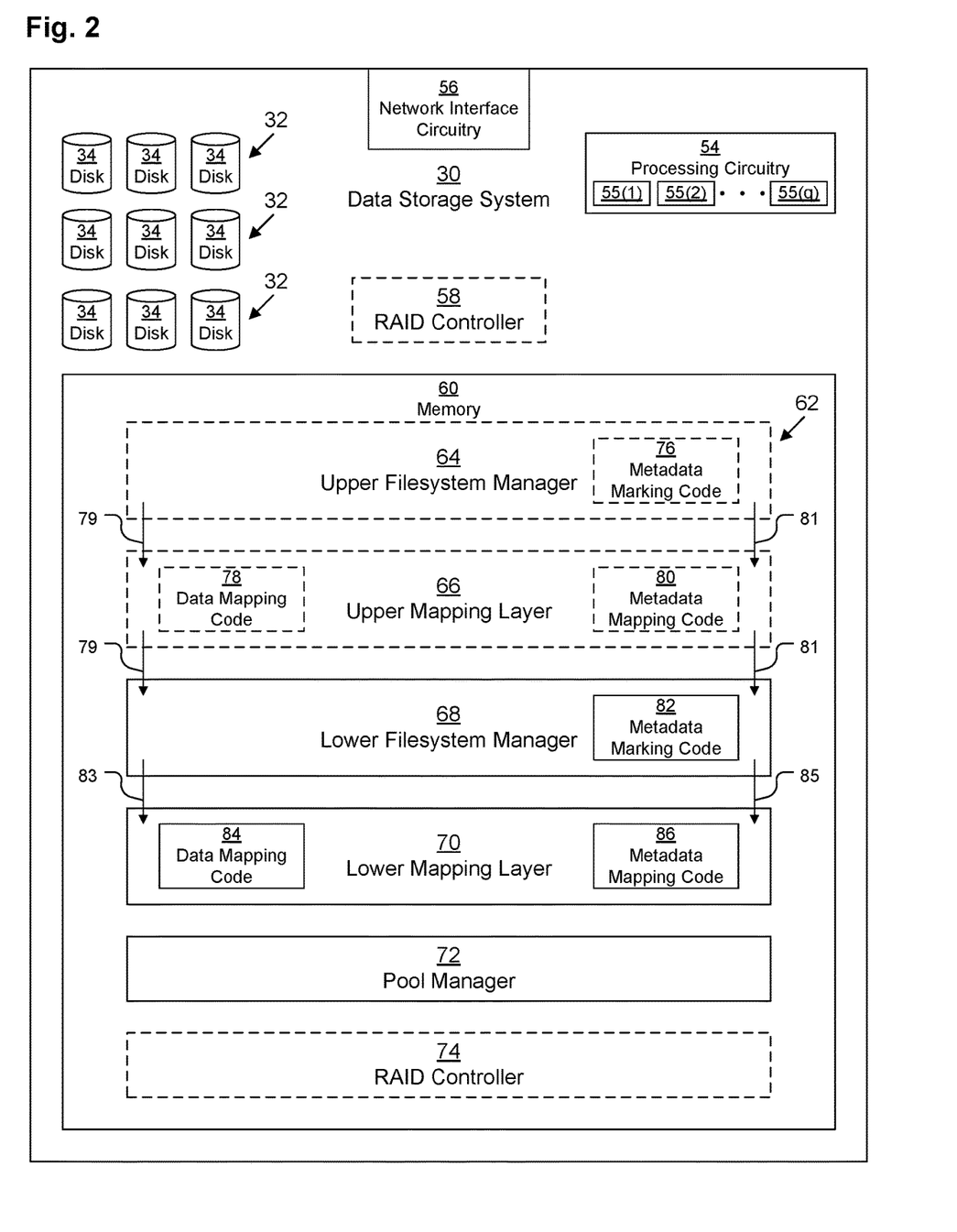
FIG. 2 is a block diagram depicting an example apparatus according to various embodiments.

FIG. 2 depicts example hardware details of DSS 30. DSS 30 includes network interface circuitry 56, processing circuitry 54, a set of arrays 32 of disks 34, and memory 60. In some embodiments, DSS 30 also includes a hardware-based RAID controller 58.

Network interface circuitry 56 may include one or more Ethernet cards, cellular modems, Wireless Fidelity (WiFi) wireless networking adapters, any other devices for connecting to a network (e.g., a storage area network, a local area network, a wide area network, etc.) or some combination thereof.

Processing circuitry 54 may be any kind of processor or set of processors configured to perform operations, such as, for example, a microprocessor, a multi-core microprocessor, a digital signal processor, a system on a chip, a collection of electronic circuits, a similar kind of controller, or any combination of the above. Processing circuitry 54 may also include circuitry configured to control the disks 34, although in some embodiments this functionality is included within RAID controller 58. As depicted, processing circuitry 54 includes multiple processing cores 55 (depicted as cores 55(1), 55(2), . . . , 55(q)), each of which is able to perform a different thread of execution simultaneously. Thus, DSS 30 is able to process several different I/O commands at once in parallel. In a typical arrangement, processing circuitry 54 may be arranged as a set of multi-core storage processors on one or more boards within a cabinet.

The arrays 32 of disks 34 may be arranged as one or more Redundant Array of Independent Disks (RAID) sets. In a typical arrangement, the disks 34 are distributed within several shelves within the cabinet. For example, in one embodiment, each shelf may hold up to 120 disks 34, and there may be up to 22 shelves of disks 34 within the cabinet, allowing up to 2,640 disks 34 within DSS 30. Disks 34 may include magnetic hard disks as well as solid-state storage drives or some combination thereof as is well-known in the art. Disks 34 may connect to the processing circuitry 54 and/or the RAID controller 58 over one or more high-speed storage interconnects (not depicted), such as Fiber Channel. Disks 34 are arranged to include a collection of logical volumes 36, 38 (see FIG. 1), each of which may extend across several disks 34 of an array 32, e.g., in a RAID configuration or some other protection scheme.

Memory 60 may be any kind of digital system memory, such as, for example, random access memory (RAM). Memory 60 stores an operating system in operation (not depicted, e.g., Linux, UNIX, Windows, or a similar operating system), various storage system management programs in operation (not depicted), and one or more applications executing on processing circuitry 54 as well as data used by those applications. Memory 60 also stores a storage stack 62, which is configured to process data storage operations directed at the DSS 30.

In some embodiments, storage stack 60 includes a software RAID controller 74, although, in other embodiments, this functionality is instead performed by hardware RAID controller 68 or by specialized circuitry of processing circuitry 54.

Storage stack 62 includes a pool manager 72, which is configured to manage the pools 40, 44 and to populate the pools 40, 44 with appropriate slices 42, 46 from volumes 36, 38 generated by RAID controller 58, 74.

Storage stack 62 also includes a lower mapping layer 70 configured to logically create volume abstractions upon which filesystems 48 may sit, mapping slices 42, 46 from the pools 40, 44 to particular address ranges of these volume abstractions. Each such filesystem 48 is managed by a lower filesystem manager 68 of the stack 62. In some embodiments, lower filesystem manager 68 manages lower-deck filesystems, which are container filesystems for files that represent further volume abstractions, while in other embodiments, lower filesystem manager 68 manages filesystems directly accessible to end users.

In embodiments in which further volume abstractions are used, stack 62 also contains an upper mapping layer 66 which maps addresses of upper-level volume abstractions to particular addresses within files of the container filesystems managed by the lower filesystem manager 68. These upper-level volume abstractions may either be exposed directly to end users or applications as block-based storage volumes or they may serve as the address space for upper-deck filesystems managed by upper filesystem manager 64 of storage stack 62. These upper-deck filesystems are typically exposed directly to end users or to applications.

Upper filesystem manager 64 may include metadata marking code 76, which is configured to mark metadata blocks 81 or other storage units of upper-deck filesystems as relating to metadata (e.g., inodes, directory files, indirect blocks, etc.) of those upper-deck filesystems, while refraining from marking non-metadata data blocks 79 as relating to metadata. Upon these data blocks 79 and metadata blocks 81 being passed down the stack 62 to the upper mapping layer 66, data mapping code 78 of the upper mapping layer 66 maps the data blocks 79 to logical addresses of the upper-level volume reserved for data, while metadata mapping code 80 of the upper mapping layer 66 maps the metadata blocks 81 to logical addresses of the upper-level volume reserved for metadata.

Upon these data blocks 79 and metadata blocks 81 being passed down the stack 62 to the lower filesystem manager 70, metadata marking code 82 of the lower filesystem manager 68 marks metadata blocks 85 of the lower-deck filesystem as relating to metadata. Since the metadata blocks 81 from the upper-deck filesystem have already been placed within logical addresses of the upper-level volume reserved for metadata, these upper metadata blocks 81 can be assigned to be marked as relating to metadata by the lower filesystem manager 68 as well. All blocks of the lower-deck filesystem that do not relate to either metadata of the lower-deck filesystem or to metadata of the upper-deck filesystem serve as non-metadata data blocks 83.

Upon these data blocks 83 and metadata blocks 85 being passed down the stack 62 to the lower mapping layer 70, data mapping code 84 of the lower mapping layer 70 maps the data blocks 83 to logical addresses of the lower-level volume abstraction reserved for data, while metadata mapping code 86 of the lower mapping layer 70 maps the metadata blocks 85 to logical addresses of the lower-level volume abstraction reserved for metadata. This arrangement allows the metadata blocks 85 (including metadata blocks 81) to be stored in metadata slices 46 from the metadata pool 44 by the pool manager 72. It also allows the data blocks 83 (including data blocks 79) to be stored in data slices 42 from the data pool 40 by the pool manager 72.

Figure 3A:
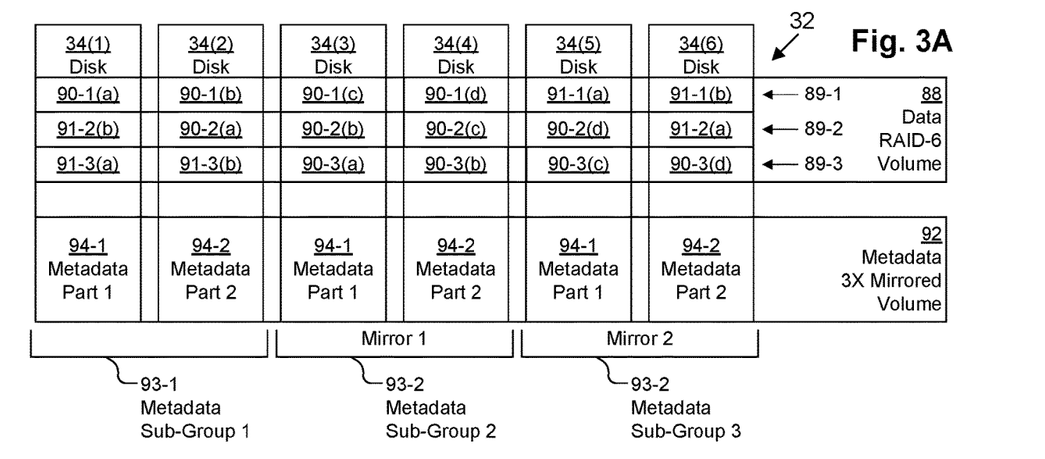
FIGS. 3A-3C are block diagrams depicting example data layouts on example disk arrays according to various embodiments.

FIG. 3A depicts an example data layout of an array 32 of disks 34 according to various embodiments. As depicted, array 32 includes six disks 34(1)-34(6).

Data RAID-6 volume 88 is an example logical data volume 36 striped across the six disks 34(1)-34(6) on which data of a filesystem 48 may be stored. Data RAID-6 volume 88 includes several stripes 89 (depicted as stripes 89-1, 89-2, 89-3, although in a typical embodiment, more than three stripes 89 are usually used). Since RAID-6 arrays include 2 parity strides per stripe, each stripe 89 contains four data strides 90 and two parity strides 91 arranged in a rotating manner. Thus the first data stride 90-1(a) of stripe 89-1 is stored on disk 34(1) and the second data stride 90-1(b) of stripe 89-1 is stored on disk 34(2), but the first data stride 90-2(a) of stripe 89-2 is stored on disk 34(2) and the second data stride 90-2(b) of stripe 89-2 is stored on disk 34(3). Similarly, the first metadata stride 91-2(a) of stripe 89-2 is stored on disk 34(6) and the second metadata stride 91-2(b) of stripe 89-2 is stored on disk 34(1), but the first metadata stride 91-3(a) of stripe 89-3 is stored on disk 34(1) and the second metadata stride 91-3(b) of stripe 89-2 is stored on disk 34(2).

Metadata triple-mirrored volume 92 is an example logical metadata volume 38 striped across the six disks 34(1)-34(6) on which metadata of a filesystem 48 may be stored. In this embodiment, because the array 32 has a number of disks 34 that is a multiple of three (i.e., six), metadata triple-mirrored volume 92 may be divided into three subgroups 93-1, 93-2, 93-3, each subgroup 93 mirroring the others. In this example, because there are six disks 34 in the array 32, each subgroup 93-1, 93-2, 93-3 contains exactly two disks 34, so the metadata stored in metadata triple-mirrored volume 92 is spread out over two disks 34. Thus first metadata sub-group 93-1 includes metadata part one 94-1 stored on disk 34(1) and metadata part two 94-2 stored on disk 34(2), while second metadata sub-group 93-2 is an exact mirror including metadata part one 94-1 stored on disk 34(3) and metadata part two 94-2 stored on disk 34(4). Similarly, third metadata sub-group 93-3 is also an exact mirror including metadata part one 94-1 stored on disk 34(5) and metadata part two 94-2 stored on disk 34(6).

Figure 3B:
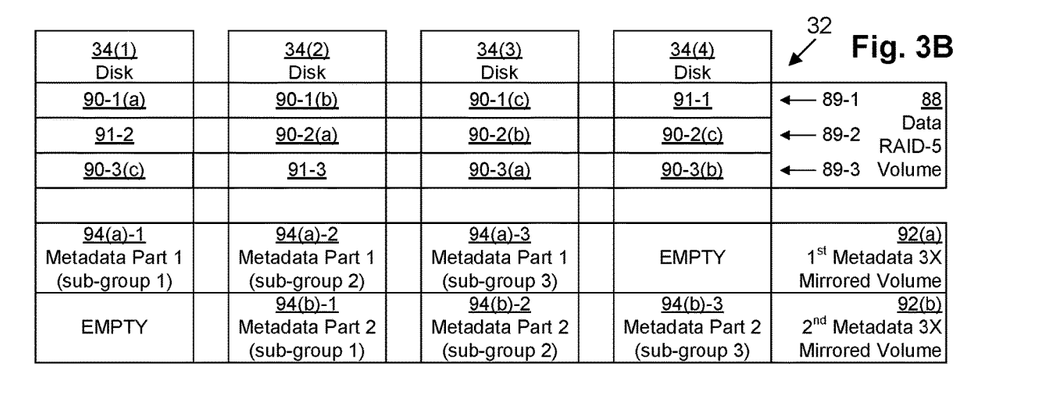

FIG. 3B depicts a somewhat similar example data layout of an array 32 of disks 34 according to various embodiments, however, as depicted, array 32 includes only four disks 34(1)-34(4). In this embodiment, data volume 88 is a RAID-5 volume rather than a RAID-6 volume, but it is otherwise similar, except having only three data strides 90 per stripe 89 and only one parity stride 91 per stripe.

However, since there are not an exact multiple of three disks 34 in the array 32, there is a complication with creating a triple-mirrored metadata volume 92. Thus, in this embodiment, each triple-mirrored metadata volume 92 is mirrored over only a sub-set of the disks 34 of the array 32. Thus, as depicted, a first triple-mirrored metadata volume 92(a) is only spread across disks 34(1)-34(3), leaving a blank space on disk 34(4). A second triple-mirrored metadata volume 92(b) is similarly only spread across disks 34(2)-34(4), leaving a blank space on disk 34(1). Although this arrangement performs well, it is not space-efficient when used on arrays 32 having a number of disks 34 that is not an exact multiple of three.

Figure 3C:
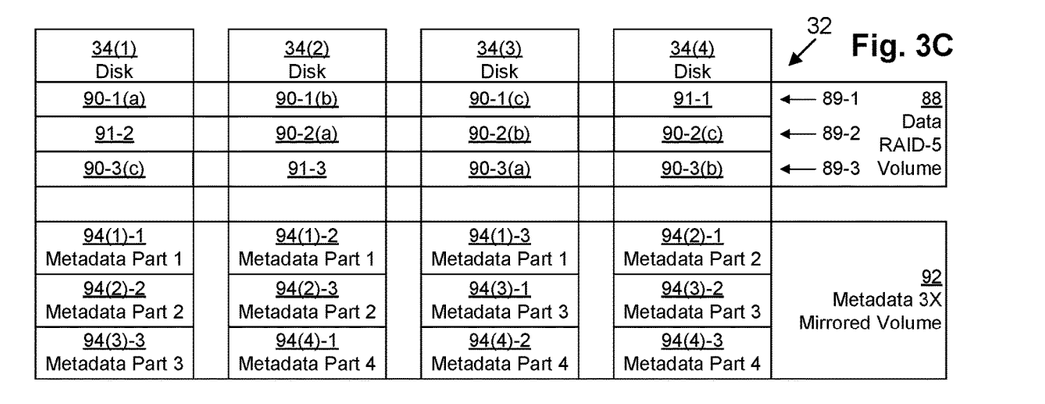

Thus, the embodiment depicted in FIG. 3C provides a more space-efficient version of this arrangement. There are similarly four disks 34(1)-34(4) in the array 32, and the data volume 88 is unchanged from FIG. 3B. However, instead of having two triple-mirrored metadata volumes 92(a), 92(b), there is one triple-mirrored metadata volume 92 with a more efficient layout. Thus, triple-mirrored metadata volume 92 contains metadata part one 94(1) mirrored across three disks 34(1), 34(2), 34(3), but instead of having wasted empty space, metadata part two 94(2) is spirals around in a round-robin fashion, filling in gaps. Thus, in one example metadata part one 94(1) is sixty-four kilobytes (KB), so the first 64 KB of triple-mirrored metadata volume 92 on disk 34(1) contains first copy of metadata part one 94(1)-1, the first 64 KB of triple-mirrored metadata volume 92 on disk 34(2) contains second copy of metadata part one 94(1)-2, and the first 64 KB of triple-mirrored metadata volume 92 on disk 34(3) contains third copy of metadata part one 94(1)-3. However, the first 64 KB of triple-mirrored metadata volume 92 on disk 34(4) is not wasted, but rather assigned to hold the first copy of metadata part two 94(2)-1. Then the second 64 KB of triple-mirrored metadata volume 92 on disk 34(1) contains second copy of metadata part two 94(2)-2 and the second 64 KB of triple-mirrored metadata volume 92 on disk 34(2) contains third copy of metadata part two 94(2)-3. Similarly, the second 64 KB of triple-mirrored metadata volume 92 on disk 34(3) contains first copy of metadata part three 94(3)-1, the second 64 KB of triple-mirrored metadata volume 92 on disk 34(4) contains second copy of metadata part three 94(3)-2, and the second 64 KB of triple-mirrored metadata volume 92 on disk 34(1) contains third copy of metadata part three 94(3)-3. Similarly, the second 64 KB of triple-mirrored metadata volume 92 on disk 34(2) contains first copy of metadata part four 94(4)-1, the second 64 KB of triple-mirrored metadata volume 92 on disk 34(3) contains second copy of metadata part four 94(4)-2, and the second 64 KB of triple-mirrored metadata volume 92 on disk 34(4) contains third copy of metadata part four 94(4)-3.

Figure 4A:
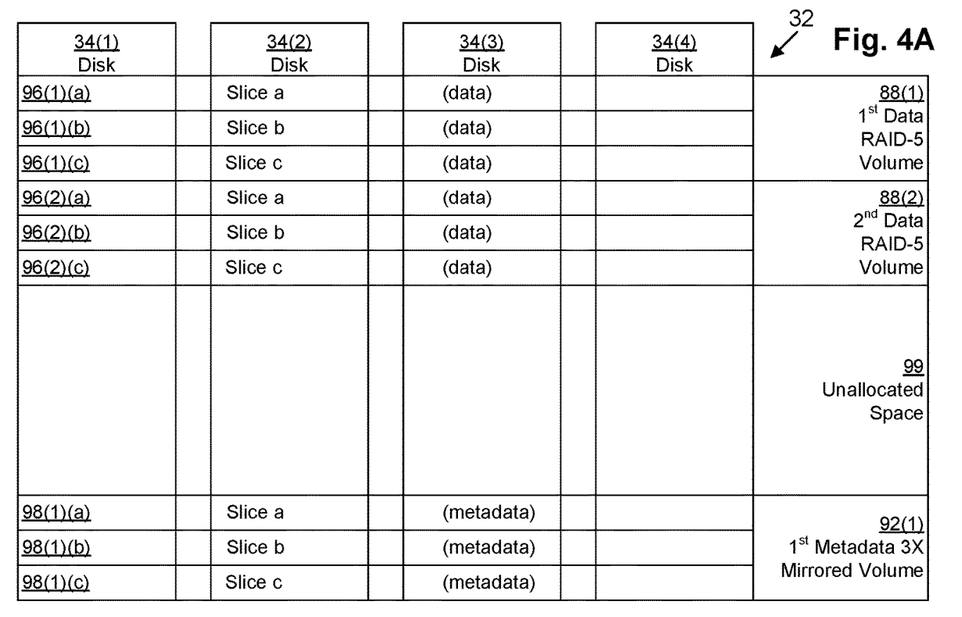
FIGS. 4A-4B are block diagrams depicting example data layouts on example disk arrays according to various embodiments.

FIG. 4A depicts an example data layout of an array 32 of disks 34 according to various embodiments, however, unlike in FIGS. 3A-3C, FIG. 4A depicts example positions of slices 42, 46 within the logical volumes 36, 38 of an array 32. The depiction of FIG. 4A represents a layout of an array 32 which has not been fully allocated between housing data volumes 36 and metadata volumes 38. As depicted, array 32 includes four disks 34(1)-34(4). There are two data RAID-5 volumes 88(1), 88(2) and one metadata mirrored volume 92(1), but there is also unallocated space 99 in between. As can be seen, the data RAID-5 volumes 88 are allocated from the beginning of the array 32, while the metadata mirrored volumes 92 are allocated from the end of the array 32.

As depicted, data RAID-5 volume 88(1) includes three data slices 96(1)(a), 96(1)(b), 96(1)(c). Because a typical slice 42, 46, 96, 98 is 256 megabytes and because a typical stride size is 64 KB (which makes the stripe size 192 KB for a 4-disk RAID-5 group), each data slice 96(1)(a), 96(1)(b), 96(1)(c) is actually made up of about 1,366 stripes 89 (not depicted in FIG. 4A, but see FIG. 3B, for example). Similarly, as depicted, metadata mirrored volume 92(1) includes three metadata slices 98(1)(a), 98(1)(b), 98(1)(c), each of which is spread out over about 1,366 stripes.

Figure 4B:
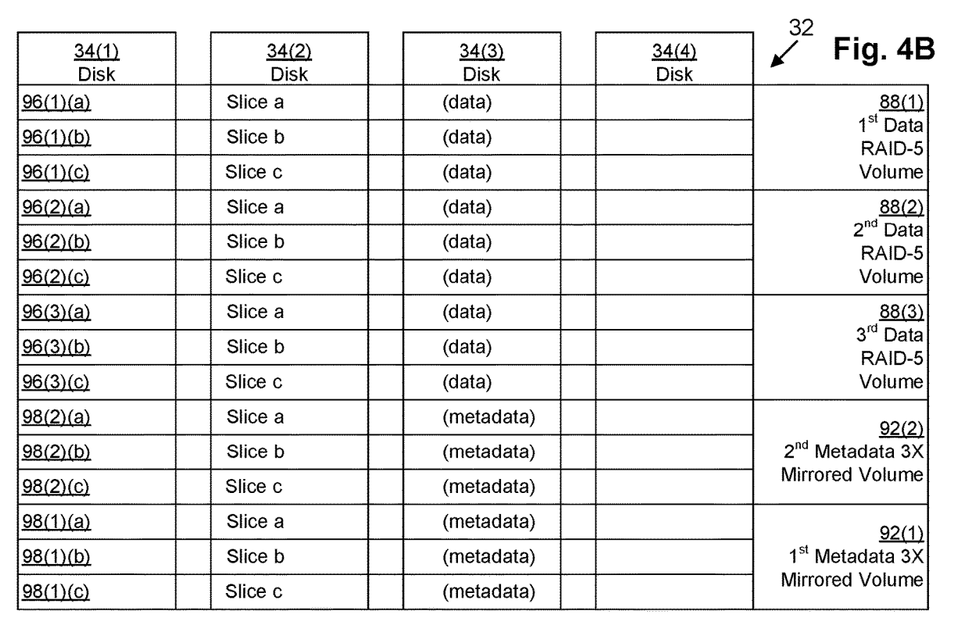

FIG. 4B depicts another example data layout of an array 32 of disks 34 according to various embodiments, however, unlike in FIG. 4A, all space within the array 32 has been allocated in FIG. 4B. This may represent the same array 32 as in FIG. 4A but at a different point in time, or it may represent a case in which the array 32 is fully allocated with dedicated logical data volumes 36 and dedicated logical metadata volumes 38 in advance. This full allocation in advance may be used, for example, in the case of systems having thickly-allocated user volumes and filesystems. As depicted in FIG. 4B, array 32 has three data RAID-5 volumes 88(1), 88(2), 88(3) and two metadata mirrored volumes 92(1), 92(2). In some embodiments, each array 32 is pre-allocated with a pre-defined fraction of its space allocated to logical metadata volumes 38, the rest being allocated to logical data volumes 36. This pre-determined fraction may be, for example, in the range of 0.1% (1/1,000) to 2% (1/50), although the exact value may depends on empirically-determined data regarding the relative size of metadata in various filesystems in common use.

Figure 5:
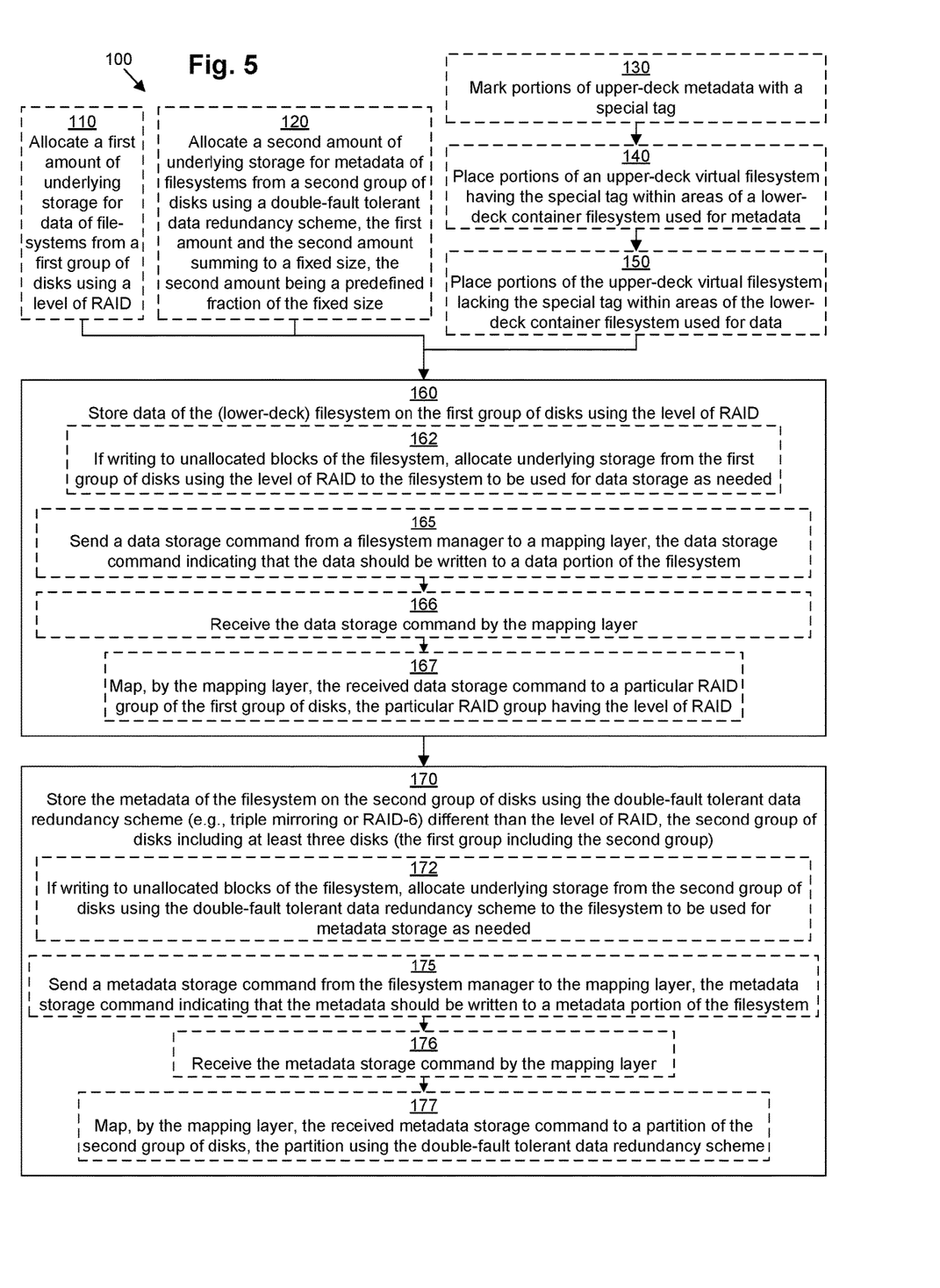
FIG. 5 is a flowchart depicting an example method according to various embodiments.

FIG. 5 illustrates an example method 100 according to various embodiments for storing data and metadata of a filesystem 48 separately, and applying a double-fault tolerant data redundancy scheme to the metadata. It should be understood that any time a piece of software (e.g., any layer 64, 66, 68, 70, 72, 74 of the storage stack 62, various sets of code 76, 78, 80, 82, 84, 86, etc.) is described as performing a method, process, step, or function, in actuality what is meant is that a computing device (e.g., DSS 30) on which that piece of software is running performs the method, process, step, or function when executing that piece of software on its processing circuitry 54 and/or RAID controller 58.

It should be understood that, within FIG. 4, steps 110-150 are dashed because they may be optional and not fundamental to method 100. However, it should be understood that, in some embodiments, one or more of the other steps or sub-steps may also be omitted. Similarly, in some embodiments, one or more steps or sub-steps may be combined together or performed in a different order. In addition, sub-steps 162-167 are dashed because they represent various example implementations of step 160, and sub-steps 172-177 are dashed because they represent various example implementations of step 170.

Steps 110 and 120 are commonly performed in conjunction when it is desired to pre-allocate all space within one or more arrays 32. Thus, in step 110, pool manager 72 allocates a first amount of underlying storage for data of filesystems 48 from a first group (e.g., array 32(a)) of disks 34 using a level of RAID (e.g., RAID-0, RAID-1, RAID-1E, RAID-2, RAID-3, RAID-4, RAID-5, RAID-6, etc.). In parallel, in step 120, pool manager 72 allocates a second amount of underlying storage for data of filesystems from a second group of disks 34 using a double-fault tolerant data redundancy scheme (e.g., triple mirroring or RAID-6, etc.), the first amount and the second amount summing to a fixed size, the second amount being a predefined fraction of the fixed size. In some embodiments, the second group of disks 34 must be a subset (either a strict subset or a non-strict subset) of the first group of disks 34 (see, e.g., FIGS. 3A-3C and 4A-4B), while in other embodiments it may be possible for the second group to be an entirely separate array 32 (e.g., array 32(b)). The pre-determined fraction may be, for example, in the range of 0.1% (1/1,000) to 2% (1/50), although the exact value may depends on empirically-determined data regarding the relative size of metadata in various filesystems in common use.

Steps 130-150 may be performed when used in conjunction with a DSS 30 that includes an upper filesystem manager 64 for managing upper-deck filesystems. Use in such situations can provide added benefit.

In step 130, upper filesystem manager 64 (e.g., running metadata marking code 76) marks portions (e.g., blocks or slices) of upper-deck metadata 81 of an upper-deck abstract (or virtual) filesystem with a special tag, such as, for example, a highest tier of service tag. This marking indicates to lower layers of the stack 62 that these portions contain metadata.

In step 140, either the upper mapping layer 66 or the lower filesystem manager 68 (e.g., running metadata mapping code 80) places portions of the upper-deck abstract (or virtual) filesystem having the special tag within areas of a lower-deck container filesystem used for metadata.

In step 150, which may be performed in parallel with step 140, either the upper mapping layer 66 or the lower filesystem manager 68 (e.g., running data mapping code 78) places portions of the upper-deck abstract (virtual) filesystem lacking the special tag within areas of the lower-deck container filesystem used for data In step 160, the storage stack 62 stores data of a filesystem 48 (e.g., a lower-deck filesystem, or, in the case of a DSS 30 that does not use multiple levels of filesystems, any filesystem built over a volume abstraction) on the first group (e.g., 32(*a*)) of disks 34 using the level of RAID. In some embodiments, step 160 may be performed by performing sub-step 162 and/or sub-steps 165-167.

In sub-step 162, if the storage stack 62 is writing to a block of the filesystem 48 that has not yet been allocated underlying storage, pool manager 72 allocates underlying storage (e.g., a new data logical volume 36) from the first group of disks 34 using the level of RAID to the filesystem 48 to be used for data storage as needed. See FIGS. 4A-4B.

In sub-step 165, lower filesystem manager 68 sends a data storage command to the lower mapping layer 70 indicating that the data 83 should be written to a data portion 52 of the filesystem 48. In sub-step 166, the lower mapping layer 70 receives the command, and, in response, in sub-step 167, lower mapping layer 70 (e.g., running data mapping code 84) maps the received data storage command to an appropriate data slice 42 (e.g., data slice 96) from a particular data volume 36 (e.g., data RAID group 88) of the first group 32 of disks 34, the particular data volume 36 having the level of RAID.

In step 170, the storage stack 62 stores metadata of a filesystem 48 (e.g., a lower-deck filesystem, or, in the case of a DSS 30 that does not use multiple levels of filesystems, any filesystem built over a volume abstraction) on the second group of disks 34 using the double-fault tolerant data redundancy scheme (e.g., triple mirroring or RAID-6) different than the level of RAID used for the data, the second group of disks including at least three disks (the first group including the second group). The second group may, in fact, be a subset (strict or not) of the first group. In embodiments in which steps 130-150 were performed, this step may include storing the upper-deck metadata 81 to the metadata volume 38 as part of the lower-deck metadata 85 with which it was combined.

In some embodiments, step 170 may be performed by performing sub-step 172 and/or sub-steps 175-177.

In sub-step 172, if the storage stack 62 is writing to a block of the filesystem 48 that has not yet been allocated underlying storage, pool manager 72 allocates underlying storage (e.g., a new metadata logical volume 38) from the second group of disks 34 using the double-fault tolerant data redundancy scheme to the filesystem 48 to be used for metadata storage as needed. See FIGS. 4A-4B.

In sub-step 175, lower filesystem manager 68 (e.g., running metadata marking code 82) sends a metadata storage command to the lower mapping layer 70 indicating that the metadata 85 should be written to a metadata portion 50 of the filesystem 48. In sub-step 176, the lower mapping layer 70 receives the command, and, in response, in sub-step 177, lower mapping layer 70 maps the received metadata storage command to an appropriate metadata slice 46 (e.g., metadata slice 98) from a particular metadata volume 38 (e.g., metadata mirrored volume 92) of the second group of disks 34, the particular metadata volume 38 having the double-fault tolerant data redundancy scheme.

Thus, embodiments have been described for protecting against metadata corruption while maintaining high performance and minimizing the number of stripes that need to be rewritten. This may be accomplished by storing the data and metadata of a filesystem 48 separately, and applying a double-fault tolerant data redundancy scheme to the metadata. Thus, the metadata of a filesystem 48 is stored on logical volumes 38, 92 that utilize triple mirroring or RAID-6 (or stronger forms of redundancy), regardless of what level of protection is used for the data of the filesystem. Since the metadata and data are stored separately, fewer stripe update operations are required.

While various embodiments of the present disclosure have been particularly shown and described, it will be understood by those skilled in the art that various changes in form and details may be made therein without departing from the spirit and scope of the present disclosure as defined by the appended claims.

For example, it should be understood that although various embodiments have been described as being methods, software embodying these methods is also included. Thus, one embodiment includes a tangible computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Finally, it should be understood that all embodiments which have been described may be combined in all possible combinations with each other, except to the extent that such combinations have been explicitly excluded.

Finally, even if a technique, method, apparatus, or other concept is specifically labeled as "conventional," Applicants make no admission that such technique, method, apparatus, or other concept is actually prior art under 35 U.S.C. § 102 or 35 U.S.C. § 103, such determination being a legal determination that depends upon many factors, not all of which are known to Applicants at this time.

What is claimed is:

1. A method performed by a computing device of protecting a filesystem against metadata corruption while maintaining high performance, the method including:
receiving a storage command directing the computing device to store a block of file data to the filesystem; and
in response to receiving the storage command:
writing the block of file data to a data portion that spans a set of drives using a single-fault tolerant level of RAID, wherein writing the block of file data to the data portion includes performing exactly two write operations to the set of drives; and
writing filesystem metadata associated with the block of file data to a metadata portion that spans a subset of the set of drives using a double-fault tolerant data redundancy scheme different than the single-fault tolerant level of RAID, the subset including at least three drives, the data portion and the metadata portion being non-overlapping, wherein writing the filesystem metadata to the metadata portion includes performing at least three write operations to the subset of the set of drives.

2. The method of claim 1 wherein the method further includes:
receiving an indication that exactly two drives of the subset of the set of drives have failed; and
in response to receiving the indication, continuing to provide access to the metadata portion by reading from a drive of the subset other than the exactly two drives.

3. The method of claim 1 wherein the single-fault tolerant level of RAID uses parity, and the method further includes:
receiving an indication that a single drive of the subset of the set of drives has failed; and
in response to receiving the indication, rebuilding the data portion of the single drive onto a replacement drive using RAID rebuilding; and
while rebuilding the data portion, continuing to provide access to the metadata portion by reading from a drive of the subset other than the single drive.

4. The method of claim 1 wherein the single-fault tolerant level of RAID is one of RAID-0, RAID-1, RAID-2, RAID-3, RAID-4, and RAID-5, and the double-fault tolerant data redundancy scheme is RAID-6.

5. The method of claim 1 wherein the single-fault tolerant level of RAID is one of RAID-0, RAID-1, RAID-2, RAID-3, RAID-4, and RAID-5, and the double-fault tolerant data redundancy scheme is triple-mirroring.

6. The method of claim 5 wherein the set of drives has a multiple of three drives, the subset is the same as the set of drives, and the subset is divided into three sub-groups of equal numbers of drives, the filesystem metadata stored on the subset being triple mirrored between the three sub-groups.

7. The method of claim 5 wherein:
the set of drives includes exactly a number of drives, the number of drives being non-divisible by three; and
the subset is the same as the set of drives, segments of the files stem metadata stored on the subset being triple-mirrored in groups of three distributed between the number of drives in a round-robin arrangement.

8. The method of claim 5 wherein the method further comprises reading the files stem metadata stored on the subset in a verified manner including reading at least two copies of the triple-mirrored metadata to ensure consistency.

9. The method of claim 1 wherein the filesystem is thickly-provisioned to have a fixed size, and the method further comprises:
pre-allocating a first amount of underlying storage for file data of the filesystem from the set of drives using the single-fault tolerant level of RAID; and
pre-allocating a second amount of underlying storage for metadata of the filesystem from the subset using the double-fault tolerant data redundancy scheme, the first amount and the second amount summing to the fixed size, the second amount being a predefined fraction within a range of 0.1% to 2% of the fixed size.

10. The method of claim 1 wherein the filesystem is thinly-provisioned having a dynamically-variable size, and the method further comprises:
as file data of the filesystem is written to the set of drives, allocating underlying storage from the set of drives using the single-fault tolerant level of RAID to the filesystem to be used for data storage as needed; and
as filesystem metadata of the filesystem is stored on the subset, allocating underlying storage from the subset using the double-fault tolerant data redundancy scheme to the filesystem to be used for metadata storage as needed.

11. The method of claim 1 wherein:
the filesystem is a lower-deck container filesystem that includes a logical file that represents an upper-deck virtual filesystem, the filesystem metadata including filesystem metadata of the lower-deck container filesystem;
the upper-deck virtual filesystem includes upper-deck metadata and upper-deck data;
the method further comprises:
marking blocks of the upper-deck metadata with a special tag;
placing blocks of the upper-deck virtual filesystem having the special tag within areas of the lower-deck container filesystem used for filesystem metadata; and
placing blocks of the upper-deck virtual filesystem lacking the special tag within areas of the lower-deck container filesystem used for file data;
the block of file data written to the data portion that spans the set of drives using the single-fault tolerant level of RAID is a block of the upper-deck virtual filesystem lacking the special tag placed within an area of the lower-deck container filesystem used for file data; and
the filesystem metadata associated with the block of file data written to the metadata portion that spans the subset of the set of drives using the double-fault tolerant data redundancy scheme is upper-deck metadata marked with the special tag placed within an area of the lower-deck container filesystem used for filesystem metadata.

12. The method of claim 1 wherein:
writing the block of file data to the data portion that spans the set of drives using the single-fault tolerant level of RAID includes:
sending a data storage command from a filesystem manager to a mapping layer, the data storage command indicating that the block of file data should be written to a data portion of the filesystem;
receiving the data storage command by the mapping layer; and
in response, mapping, by the mapping layer, the received data storage command to a particular RAID group of the set of drives, the particular RAID group having the single-fault tolerant level of RAID; and
writing the filesystem metadata associated with the block of file data to the metadata portion that spans the subset of the set of drives using the double-fault tolerant data redundancy scheme includes:
sending a metadata storage command from the filesystem manager to the mapping layer, the metadata storage command indicating that the filesystem metadata should be written to a metadata portion of the filesystem;
receiving the metadata storage command by the mapping layer; and
in response, mapping, by the mapping layer, the received metadata storage command to a partition of the subset, the partition using the double-fault tolerant data redundancy scheme.

13. A computer program product comprising a non-transitory computer-readable storage medium storing a set of instructions, which, when executed by a processor of a data storage system, cause the processor to protect a filesystem against metadata corruption while maintaining high performance by:

receiving a storage command directing the data storage system to store a block of file data to the filesystem; and in response to receiving the storage command:

writing the block of file data to a data portion that spans a set of drives using a single-fault tolerant level of RAID, wherein writing the block of file data to the data portion includes performing exactly two write operations to the set of drives; and writing filesystem metadata associated with the block of file data to a metadata portion that spans a subset of the set of drives using a double-fault tolerant data redundancy scheme different than the single-fault tolerant level of RAID, the subset including at least three drives, the data portion and the metadata portion being non-overlapping, wherein writing the filesystem metadata to the metadata portion includes performing at least three write operations to the subset of the set of drives.

14. An apparatus comprising:

a set of drives logically arranged in an array; and memory coupled to processing circuitry configured to cause the apparatus to protect a filesystem against metadata corruption while maintaining high performance by:

receiving a storage command directing the apparatus to store a block of file data to the filesystem; and in response to receiving the storage command:

writing the block of file data to a data portion that spans the set of drives using a single-fault tolerant level of RAID, wherein writing the block of file data to the data portion includes performing exactly two write operations to the set of drives; and writing filesystem metadata associated with the block of file data to a metadata portion that spans a subset of the set of drives using a double-fault tolerant data redundancy scheme different than the single-fault tolerant level of RAID, the subset including at least three drives, the data portion and the metadata portion being non-overlapping, wherein writing the filesystem metadata to the metadata portion includes performing at least three write operations to the subset of the set of drives.

* * * * *